C. LETIN.
SPLITTING MACHINE.
APPLICATION FILED MAY 5, 1915.
1,203,753.
Patented Nov. 7, 1916.
2 SHEETS—SHEET 1.
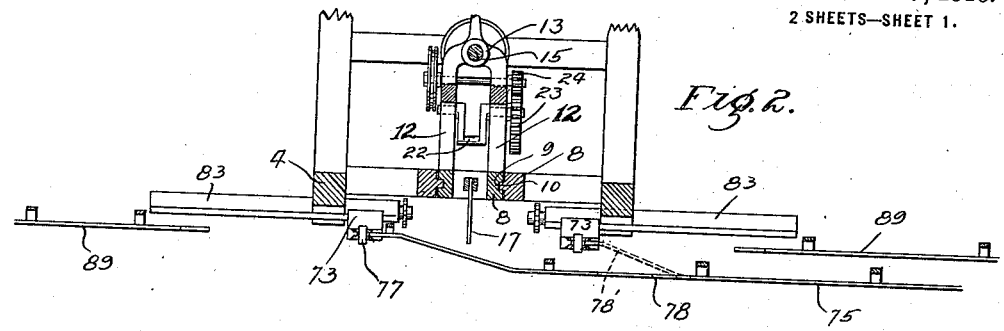
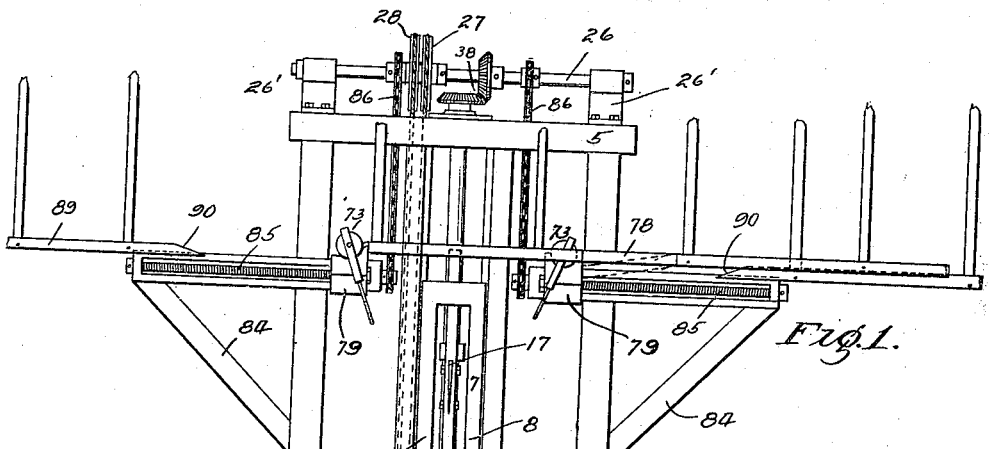
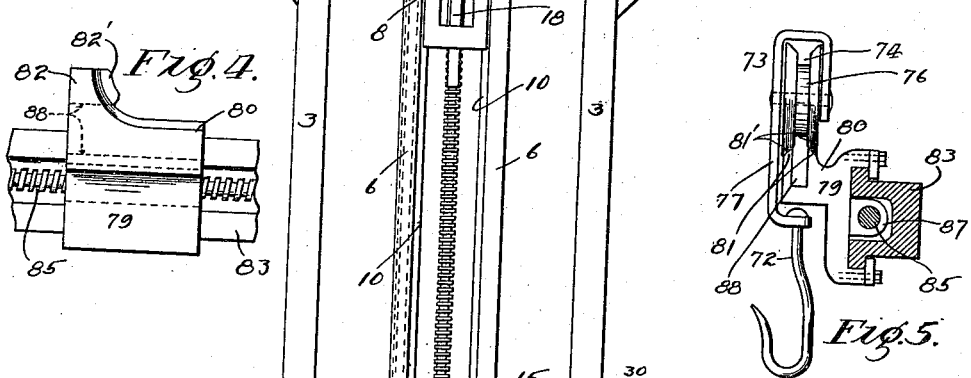
WITNESSES:
INVENTOR.
Chris Letin
BY
ATTORNEYS.

C. LETIN.
SPLITTING MACHINE.
APPLICATION FILED MAY 5, 1915.
1,203,753.
Patented Nov. 7, 1916.
2 SHEETS—SHEET 2.
Fig. 3.
Fig. 6.
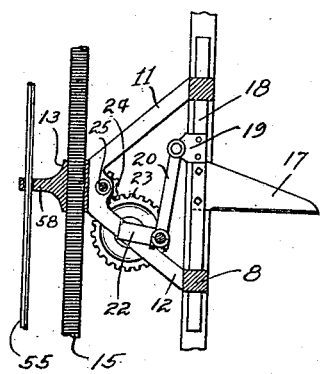
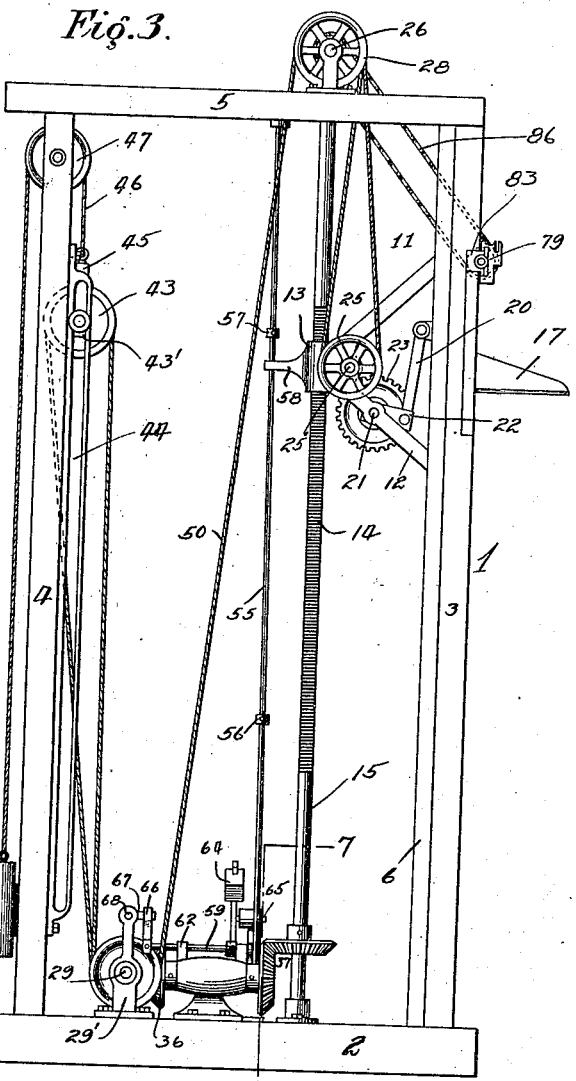
Fig. 7.
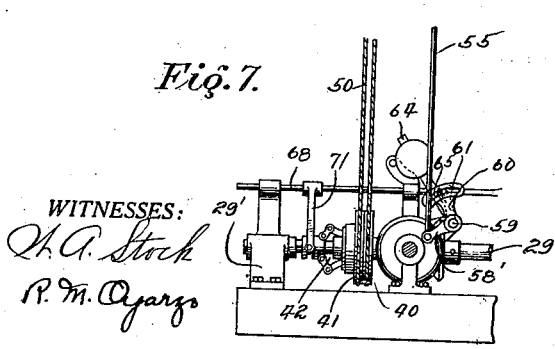
WITNESSES:
INVENTOR.
Chris Letin
BY
ATTORNEYS.

UNITED STATES PATENT OFFICE.

CHRIS LETIN, OF SAN FRANCISCO, CALIFORNIA.

SPLITTING-MACHINE.

1,203,753.

Specification of Letters Patent. Patented Nov. 7, 1916.

Application filed May 5, 1915. Serial No. 25,957.

*To all whom it may concern:*

Be it known that I, CHRIS LETIN, a citizen of the United States, residing at San Francisco, in the county of San Francisco and State of California, have invented certain new and useful Improvements in Splitting-Machines, of which the following is a specification.

This invention relates to improvements in machines for splitting carcasses of slaughtered animals.

The principal object of my invention is to provide a machine for expeditiously splitting carcasses longitudinally through the backbone.

Another object of the invention is to so construct the machine that the carcasses are placed in position from the usual overhead trackway and when split the two halves are automatically removed to similar trackways.

Another object of my invention is to provide means whereby the machine automatically reverses at each end of its travel and whereby when the knife holding frame is being raised the knife remains stationary within the frame.

Still another object of my invention is to so construct the machine that the halves of the carcasses are moved apart from each other thereby providing a clear space in which the knife may operate.

With these and other objects in view my invention consists in the novel construction, combination and arrangement of parts as herein described and more specifically pointed out in the appended claims.

Reference being had to the accompanying drawing forming a part of this specification, Figure 1 is a view in front elevation of my improved machine. Fig. 2 is a view in section through the upper part thereof. Fig. 3 is a view in side elevation. Fig. 4 is an enlarged view of a sliding block on which one leg of the carcass is supported. Fig. 5 is a view in section through the guides showing the supporting member of Fig. 4 in end elevation, together with the wheel truck thereon. Fig. 6 is a view in section through the knife supporting frame. Fig. 7 is a view in section on the line 7—7, Fig. 3.

Referring to the various parts in the several views by the same numerals of reference, 1 denotes a suitable framework provided with a base 2, the upright members 3 and 4, and the top 5. Between the upright members 3 are provided two upright guide members 6 for the knife carrying frame 7. This frame comprises a rectangular portion 8, having grooves 9 adapted to fit correspondingly shaped tongues 10 in the vertical members 6.

Extending rearwardly from the rectangular frame 8 are certain angularly disposed brace members 11 and 12 connecting the rectangular frame 8 with a sleeve 13, which is interiorly screw threaded and adapted to coact with the screw threads 14 on the vertical shaft 15. The cutting knife is denoted by 17, this knife being fastened in a bar 18 preferably square in cross section and which is adapted to reciprocate through openings in the upper and lower cross members of the rectangular frame 8. This bar is also provided with rearwardly extending lugs 19 to which is attached the connecting rod 20.

Pivotally mounted in suitable bearings in the brace member 12 is a shaft 21 having a crank 22, to which the other end of connecting rod 20 is attached. This shaft has keyed on one end a toothed gear 23 meshing to the corresponding tooth pinion 24 mounted on shaft 25', which is also pivotally mounted in the brace members 11 and 12. This shaft on the opposite end is provided with a rope sheave 25 through which the knife receives its power. On the top 5 are suitable bearings 26' in which is mounted a shaft 26 and loosely mounted on this shaft are two rope sheaves 27 and 28.

29 denotes the power shaft pivotally mounted on bearings 29' on the base 2, this shaft being driven by means of belts 30 and 31 traveling the opposite directions and running over the pulleys 32, 33, 34 and 35, pulleys 32 and 35 being keyed upon the shaft 29 while pulleys 33 and 34 are revolubly mounted thereon. The belts are spaced so that one belt is on a tight pulley while the other is on a loose pulley, and I prefer to so arrange the pulleys that belt 30 which imparts rotation to the screw 15 in such a direction that the knife frame is carried upwardly will drive the shaft 29 at a higher speed than belt 31, which causes the knife to be lowered.

The motion from shaft 29 is transmitted to the screw 15 by means of two pairs of beveled gears 36 and 37 and the shaft 15 in turn drives shaft 26 through a pair of gears 38. Shaft 29 has also mounted on it two rope sheaves 40 and 41, these rope sheaves being freely mounted but so arranged that 41 may be connected to the shaft through a suitable clutch mechanism 42. A rope sheave 43 is mounted in bearings 43' which are slidably arranged in the guides 44 and this sheave is provided with a yoke 45 to which is attached a cable 46. The latter passes over a suitable pulley 47 and has on its opposite end a weight 48 by which the required tension is produced on the driving cable.

The endless driving cable, denoted by 50, passes around the driving sheave 41 over sheaves 28 and 25, thence up sheave 27, thence down and around sheave 40 to the takeup 43 and from thence returning to sheave 41. In this manner sheave 25 is driven without the ropes crossing and at the same time is free to move up and down with the knife frame, the slack due to such movement being taken up by means of the weight 48 coacting on the rope wheel 43.

The automatic reversing of the shaft 15 is accomplished by means of the following mechanism. A rod 55 is slidably mounted in a guide at top 5, this rod being provided with adjustable spaced collars 56 and 57. The sleeve 13 is provided with a rearwardly extending bifurcated arm 58 which embraces the rod 55 and is adapted to contact with collars 56 and 57. The lower end of the rod is attached to an arm 58' revolubly mounted on shaft 59, this arm having a second arm 60 formed rigidly therewith in which is an arc shaped slot 61. Shaft 59 is mounted in bearings 62 and has keyed thereon a weighted arm 64, this arm being provided with a pin 65, which enters the slot 61. The opposite end of shaft 59 is provided with an arm 66 and contacts with a pin 67 in the slidable rod 68. This rod has its axis parallel to shaft 29 and is mounted in bearing superimposed on the bearings 29', which support this shaft. At one end, the rod is provided with suitable fingers 70, which are arranged to contact with the belts 30 and 31 thereby shifting the latter from the tight to the loose pulley and vice versa. Adjacent the other end of the rod is mounted a forked arm 71, which arm engages the groove of the sleeve of the friction clutch 42, thereby throwing the latter in and out of engagement. This clutch is so arranged that when belt 30 is driving the shaft 29 so as to raise the knife frame, the clutch is out of action thereby rendering the knife stationary.

I will now describe the means by which the carcasses are placed on the machine and by which the same are spread apart as the cutting proceeds, and by which the carcasses after skinning are suspended by the tendons of the hind legs from the hook 72 of a wheel traveler 73. This traveler is of the usual construction having the flanged wheel 76 with a groove 74 adapted to travel on a rectangular track 75, this wheel being pivotally suspended to the hook 72. The trackway 75 by which the carcasses are delivered to the splitting machine is supported in front of the machine and provided at 78 with a suitable switch mechanism by which the first wheeled roller may be sent to the left hand side of the machine while the second roller is diverted by means of a curved track to the right hand side of the machine.

The travelers 73 on leaving the track position themselves on the guide blocks 79 shown in detail in Figs. 4 and 5, and which comprise the portion 80 having the angular faces 81 on which the wheel flanges are adapted to rest. I prefer to construct these flanges with converging angular faces 81 in order to hold the wheel on the block without the use of groove 74. The portion of the block on the side toward the center of the machine is curved upwardly as at 82 to about half the height of the wheel and provided with a tongue 82' adapted to enter the groove of the wheel to afford an additional security against being laterally displaced. The block is adapted to fit over the guide bar 83 which is supported in the upright members 3, the outer end being held by braces as shown at 84. The guide bar 83 contains a screw threaded shaft 85, the one side being right hand threaded and the other side being left hand threaded. These shafts are pivotally mounted in each end of the guides 83 and are driven by means of sprocket chains 86 from the shaft 26. The block 80 is provided with an extending lug 87, this lug being screw threaded to coact with the threads of shafts 85 thereby moving the block along the guide bar. The extending portion of the block 80 is provided with a longitudinal groove 88 and in alinement with this groove on each side of the machine are certain tracks 89, these tracks being tapered adjacent the free ends as shown at 90 whereby when the block moves outwardly, this tapered end enters the slot 88 and contacts with the groove of the wheel whereby it raises the weight of the supporting block.

The operation of this machine is as follows:—The carcasses are received over the trackway 75 with their backs toward the machine. The first traveler is allowed to pass over the straight track of the switch 78 when this portion is swung out of position and the portion 78' is placed in position by any of the well known switch mechanisms so that the second traveler is run over this track upon the right hand block 79. The machine is then started in operation, cable 50 driving wheel 25 and through the gears 23 and 24 causing rotation of the crank 22 and the reciprocation of the knife 17. At the same time screw shaft 15 is turned to lower the knife frame whereby each stroke is delivered at a lower point than the preceding one. Also through the operation of the screw threaded shafts 85, the two halves of the carcasses supported on the travelers 73 are being constantly pulled apart thereby giving a clear space for the operation of the knife. This operation proceeds until the knife reaches its lowest point for which it is adjusted when it contacts with the collar 56 on the shaft 55 and thereby moves the arm 58 and its slotted companion arm 60 to the left. This movement proceeds until the weighted arm 64 passes over the center. The movement is then continued by the weighted arm shifting belt 30 to the tight pulley as shown in Fig. 1, belt 31 to the loose pulley and at the same time throwing out of engagment the clutch 42 stopping the movement of the knife. This reverses the direction of screw shafts 15 and 18, and as previously described gives a quick return movement to the knife frame and the blocks 79. When the latter blocks reach the end of their outward travel the ends of track 89 enter the slots 88 in blocks 79 and lift the travelers 73 a sufficient distance to throw their weight upon the tracks 89 whereby when the blocks start on the backward motion the wheels with their load will remain on the track and may be carried away to their proper destination.

While I have shown and described the preferred embodiment of my invention it will be understood that minor changes may be made in detail and design without departing from the scope of the claims.

What I claim and wish to cover by Letters Patent is:—

1. A carcass splitting machine comprising ing a power shaft, a reciprocating knife adapted to be indirectly connected to and driven by said shaft, blocks for carrying the weight of the carcass, said blocks being actuated by said shaft whereby they are moved apart as said knife moves through the carcass.

2. A carcass splitting machine comprising a power shaft, a reciprocating knife adapted to be indirectly connected to and driven by said shaft, blocks for supporting the carcass disposed on each side of the knife, mechanism actuated by said shaft for causing a relative vertical movement between said knife and its supporting blocks and other means driven by said shaft for causing the outward movement of said blocks in opposite direction as said knife moves through the carcass.

3. A carcass splitting machine comprising a power driven shaft, a knife frame, a knife indirectly connected to and actuated by said shaft and adapted to be reciprocated thereby within said frame, guide ways on each side of said knife disposed at right angles to the movement of said knife, mechanism driven by said shaft for causing a relative vertical movement between the knife frame and the guide ways, blocks carried by said guide ways for supporting the carcass to be split, the said blocks being indirectly connected to the shaft in such a manner as to cause the outward movement thereof in opposite direction as the knife moves through the carcass.

4. A carcass splitting machine comprising a power shaft a reciprocating cutting knife actuated by said power shaft and means operated by said shaft for supporting and separating the hide of the carcass as the knife cuts longitudinally through the same.

5. A carcass splitting machine, comprising a framework, a vertical guideway formed in said framework, a knife-frame slidable in said guideway, a knife adapted to reciprocate in said frame, a shaft having a crank pivotally mounted in said knife frame, a rod connecting said crank with said knife to cause the reciprocation, a vertical screw threaded shaft engaging said knife frame, means for imparting rotation to said crank shaft and said screw threaded shaft, said means being so arranged that when the screw shaft moves said knife frame upwardly said crank shaft is not rotated.

6. A carcass splitting machine comprising a reciprocating knife adapted to split the carcass longitudinally along the backbone, wheeled carriers adapted to be attached to the two halves of said carcass, horizontally movable blocks adapted to receive and support said wheeled carriers, means for moving said blocks apart as the splitting operation proceeds and trackways adapted to engage said wheeled carriers and lift the same from said block when the splitting operation is finished.

In testimony whereof I affix my signature in presence of two witnesses.

CHRIS LETIN.

Witnesses:
W. A. STOCK,
R. M. OYARZO.

Copies of this patent may be obtained for five cents each, by addressing the "Commissioner of Patents, Washington, D. C."